United States Patent [19]
Nakamura

[11] Patent Number: 5,322,303
[45] Date of Patent: Jun. 21, 1994

[54] TOOL CHUCK

[75] Inventor: Daijiro Nakamura, Ono, Japan

[73] Assignee: Jacobs Japan, Inc., Okazaki, Japan

[21] Appl. No.: 971,730

[22] Filed: Nov. 4, 1992

[30] Foreign Application Priority Data

Nov. 11, 1991 [JP] Japan .................. 3-323745

[51] Int. Cl.⁵ .............................. B23B 31/12
[52] U.S. Cl. ........................ 279/62; 279/902
[58] Field of Search ................ 279/60-65, 279/158, 902

[56] References Cited
U.S. PATENT DOCUMENTS 5,172,923 12/1992 Nakamura .............. 279/62

FOREIGN PATENT DOCUMENTS 300375 1/1989 European Pat. Off. ........... 279/902

Primary Examiner—Steven C. Bishop
Attorney, Agent, or Firm—Darby & Darby

[57] ABSTRACT

In construction of a tool chuck in which manual rotation of an outer operation sleeve causes concurrent rotation of an inner screw ring to move clamping jaws in a chuck body following the principle of screw feeding, a solid lubrication coating layer is interposed between the screw ring and the chuck body so as to minimize friction between the two elements during their relative rotation for clamping a tool via the jaws, thereby effectively utilizing input torque from the operation sleeve for clamping operation. The solid lubrication coating layer may be applied either to a washer or directly to the screw ring.

6 Claims, 5 Drawing Sheets

TOOL CHUCK

BACKGROUND OF THE INVENTION

The present invention relates to a tool chuck, and more particularly relates to improvement in construction of a chuck for firmly holding a tool such as a drill bit or a driver bit of electric work devices by means of three or more clamping jaws.

One typical example of such a tool chuck is proposed in Japanese Utility Model Laid-open Sho. 63-189509. The tool chuck of this earlier application includes a tubular chuck body which slidably accommodates a plurality of clamping jaws in its front section in a coaxial and forwardly converging arrangement. Each clamping jaw is kept in outward screw engagement on its proximal section with a screw ring which is in an annular cutout formed in the intermediate section of the chuck body. This screw ring is in turn kept in screw engagement with an operation sleeve idly inserted over the chuck body for manual operation.

As the operation sleeve is manually rotated, the screw ring is driven into concurrent rotation in the clamping direction which in turn causes convergent, collective forward sliding of the clamping jaws via screw feeding to hold a tool inserted into the center section of the chuck body. As the jaws clamp the tool, reaction from the tool is transmitted to the screw ring via the clamping jaws and the screw ring is force to move rearwards. As a result, the rear face of the screw ring is brought into tight pressure contact with the rear side wall of the annular cutout in the chuck body.

This pressure contact generates friction resistance against rotation of the screw ring within the annular cutout. As a result, a great deal of input torque from the operation sleeve is consumed to overcome this friction resistance without effectively producing high degree of clamping force on the tool. In other word, input torque from the operation sleeve is greatly wasted without effective utilization.

SUMMARY OF THE INVENTION

It is the basic object of the present invention to provide a heavy duty tool chuck which assures high efficiency utilization of its input torque for clamping of a tool.

In accordance with the basic aspect of the present invention, jaws for clamping a tool are mechanically connected to an outer operation sleeve idly inserted over a chuck body via an intermediate screw ring and a lubricative washer is interposed between an annular cutout formed in the chuck body and the screw ring accommodated therein.

Figure 1:
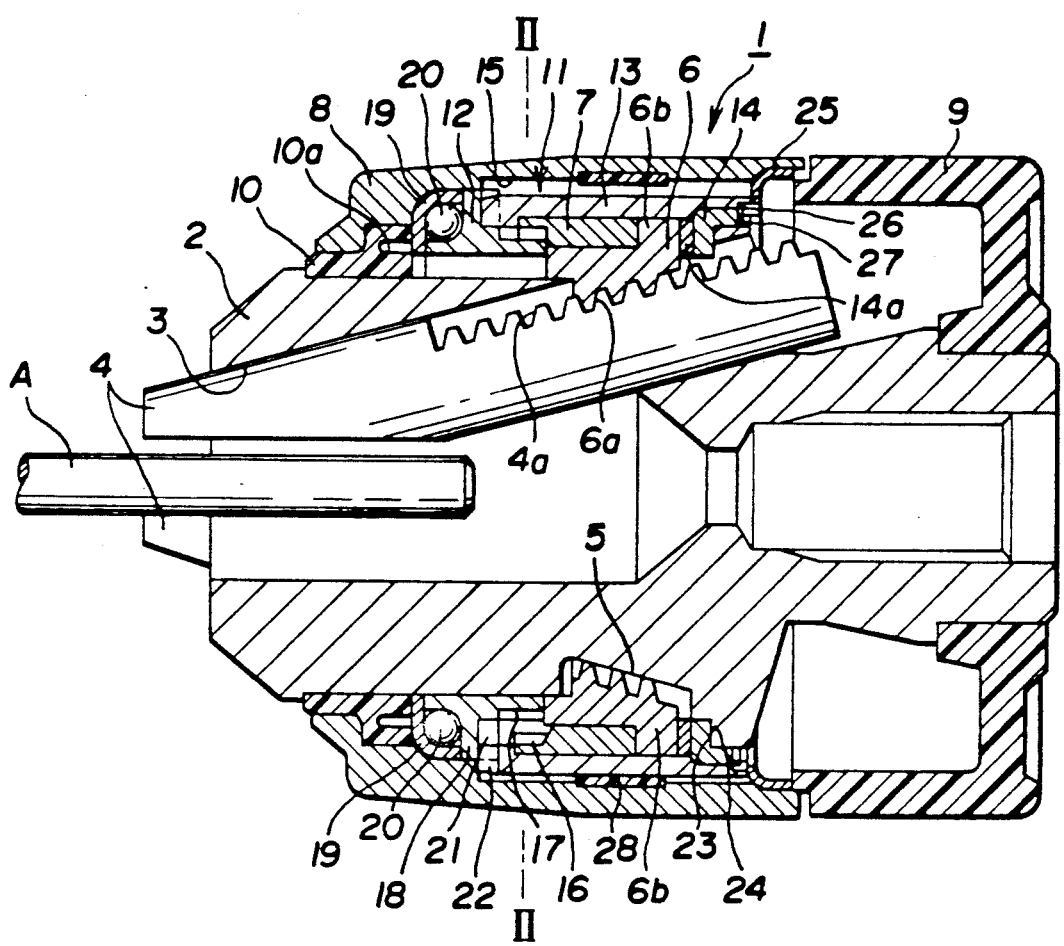
FIG. 1 a side view, partly in section, of one embodiment of the tool chuck in accordance with the present invention in a position before clamping a tool.
Figure 2:
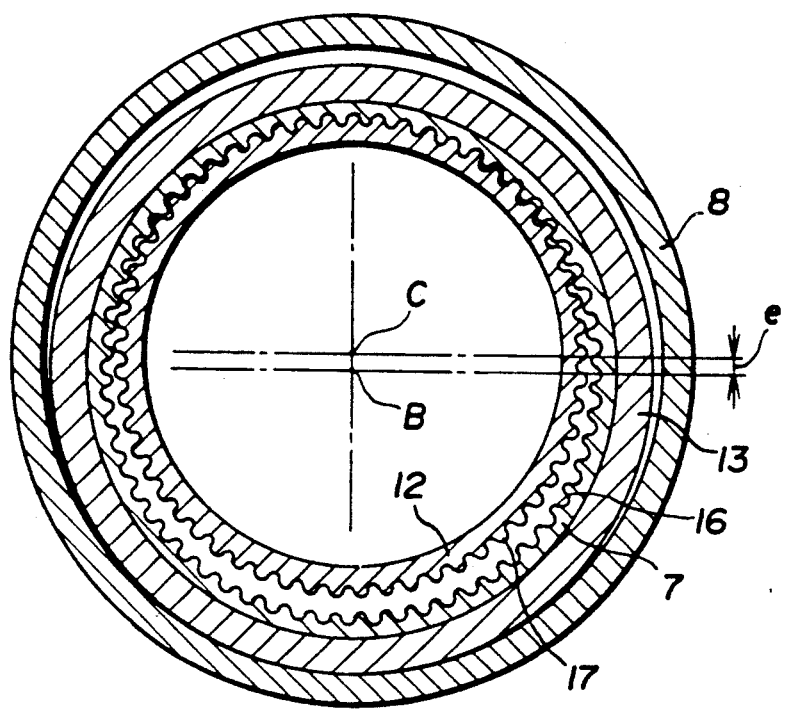
FIG. 2 is a section taken along a line II—II in FIG. 1.

One embodiment of the tool chuck in accordance with the present invention is shown in FIGS. 1 and 2 in a position before clamping a tool. In this case, the tool chuck 1 is provided with a power transmission unit 11 which is interposed between an outermost operation sleeve 8 and an innermost screw ring 6 and includes a later described cycloidal gear arrangement. More specifically, the tool chuck 1 includes, as major elements, a chuck body 2 of a tubular construction, a plurality of clamping jaws 4 slidably accommodated in the chuck body 2, the operation sleeve 8 idly inserted over the chuck body 2 for manual operation, an input ring 12 idly and eccentrically inserted into the operation ring 8, the first fixer ring 13 inserted into the operation sleeve 8, an output ring 7 inserted in one body into the fixer ring 13 and the screw ring 6 inserted in one body into the output ring 7 in meshing engagement with the clamping jaws 4. The output and input rings 7, 12 form the above-described cycloidal gear arrangement and come into selective meshing engagement with each other.

The chuck body 2 has a tubular construction which is provided in the intermediate section with an annular cutout 5 idly receptive of the screw ring 6. The chuck body 2 is further provided in the front section with a pluraily of guide holes 3 for sliding movement of the clamping jaws 4. Three sets of guide holes 3 are shown in the illustration coaxially around the center axis of the chuck body 2 at equal angular intervals. The guide holes 3 extends forwards collectively and convergently.

Each clamping jaw 4 is provided on the proximal section with outer gear teeth kept in meshing engagement with the screw ring 6. The screw ring 6 is of a split type made up of a pair of ring halves 6b each provided with inner gear teeth 6a in meshing engagement with the outer gear teeth 4a on the clamping jaws 4. The ring halves 6b are force inserted into the output ring 7. As the screw ring 6 rotates in the annular cutout 5, the clamping jaw 4 moves forwards or rearwards in the associated guide hole 3 depending on the direction of rotation of the screw ring 6 following the principle of screw feeding.

The operation sleeve 8 is idly inserted over the front section of the chuck body 2 and a holder ring 9 is fixedly inserted over the rear section of the chuck body 2. The rear end of the operation sleeve 8 is rotatably inserted over the front end of the holder ring 9. An elastic sleeve 10 made of synthetic resin is interposed between the operation sleeve 8 and the front section of the chuck body 2. The elastic sleeve 10 is fixed to either of the two facing elements 8 and 2.

The elastic sleeve 10 is provided with an annular sleeve 10a. As later described in more detail, compressive deformation of the elastic sleeve 10 controls state of meshing in the cycloidal gear arrangement. Further, the elastic sleeve 10 operates as a stopper for the power transmission unit 11 too.

The power transmission unit 11 amplifies input torque from the operation sleeve 8 in order to transmit to the screw ring 6. The power transmission unit 11 is made up of the output ring 7 fixedly inserted over the screw ring 6, the input ring 12 idly and eccentrically inserted into the operation sleeve 8, the first fixer ring 13 arranged around the screw ring 6 and the output ring 7, the second fixer ring 14 fixedly inserted into the rear section of the first fixer ring 13, and a lubricative washer 14a interposed between the screw ring 6 and the second fixer ring 14.

As best seen in FIG. 2, the operation ring 8 has an inner periphery 15 whose enter axis C is deviated from the center axis B of the chuck body 2 by a distance "e". Stated otherwise, the operation sleeve 8 is arranged eccentric to the center axis B of the chuck body 2. Thus, as the operation sleeve 8 rotates, the input ring 12 revolves about the center axis B of the chuck body 2.

Figure 6:
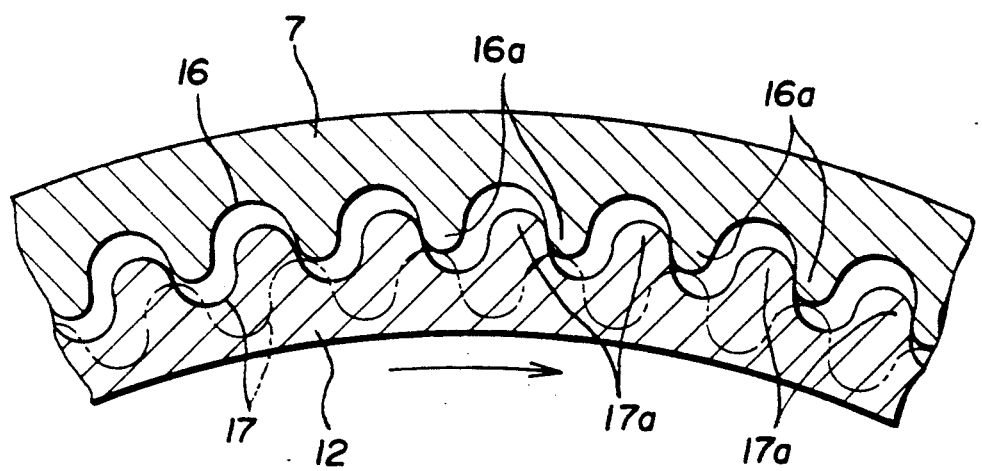
FIG. 6 is an enlarged fragmentary view of a cycloidal gear arrangement used for the tool chuck shown in FIGS. 1 and 2.
Figure 7:
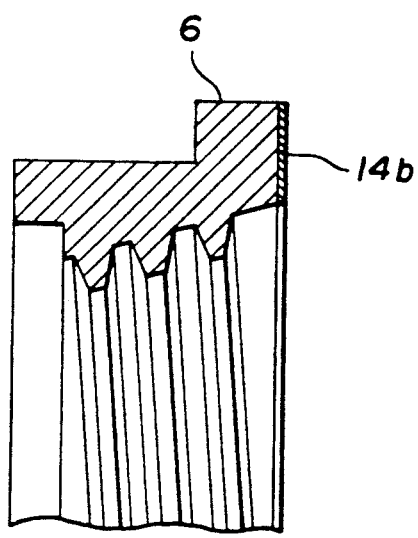
FIG. 7 is a sectional side of a screw ring used for the tool chuck shown in FIGS. 1 and 2.

Cycloidal gear teeth 16 are formed on the inner periphery of the output ring 7 and cycloidal gear teeth 17 are formed on the outer periphery of the input ring 12 with prescribed difference in teeth number. Tips 16a and 17a of these cycloidal gear teeth 16, 17 are rounded as shown in FIG. 6 for smooth slide meshing. When the input ring 12 is driven for revolution by manual rotation of the operation sleeve 8, the difference in teeth number causes corresponding rotation of the input ring 12. In other word, rotation of the operation sleeve 8 is greatly decelerated and this deceleration causes corresponding torque amplification. Thus, output torque from the input ring 12 is much larger than the input torque from the operation sleeve 8.

Assuming that the output ring 7 and 68 teeth and the input ring 12 has 65 teeth, the difference in teeth number is equal to 3. Then, the deceleration ratio is calculated by the following equation;

$$3/65 = 1/21.6$$

This large deceleration ratio results in high degree torque output from the output ring 7.

The input ring 12 is provided on its intermediate section with an outer flange 18 and a washer type holder ring 19 is idly inserted into the front section of the operation sleeve 8 in order to rotatably sandwich thrust balls 20 between itself and the outer flange 18 on the input ring 12. Recesses 21 are formed in the rear face of the outer flange 18 and like number of pins 22 are secured on the front face of the first fixer ring 13 in engagement with the respective recesses 21 in the outer flange 18. Each pin 22 and recess 21 are sized to allow revolution of the input ring 12. The pin-recess engagement locks the first fixer ring 13 against rotation in order to inhibit rotation of the input ring 12 whilst allowing its revolution only.

The second fixer ring 14 is provided on its rear face with an abutment 23 and a like abutment 24 is formed on the chuck body 2. When the jaws 4 clamp the tool, reaction from the tool forces the screw ring 6 to move rearwards and brings the abutments 23 and 24 into pressure contact to securely couple the second fixer ring 14 to the chuck body 2. The first fixer ring 13 is also locked against rotation under this condition.

Figure 3:
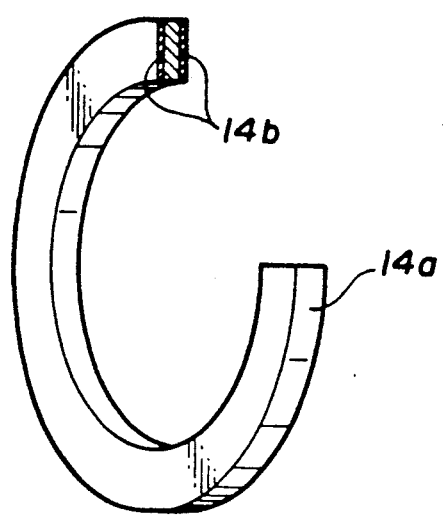
FIG. 3 is a perspective view of a lubricative washer used for the tool chuck shown in FIGS. 1 and 2.

The lubricative washer 14a is interposed between the screw ring 6 and the second fixer ring 14. This washer 14a is covered with solid lubrication coating 14b as shown in FIG. 3 in order to reduce friction between the two elements 6 and 14 during relative rotation between them.

The solid lubrication coating 14b contains molybdenum bisulfide, graphite or fluorine resin and endurable against high surface pressure and high heat. For example, the commercial product "DEPHLICCOAT" produced by Kawamura Kenkyuusyo is advantageously used.

An elastic ring 25 is securely inserted into the rear end of the operation sleeve 8 whilst facing the rear end of the second fixer ring 14. A plurality of tongues 26 are formed along the periphery of the elastic ring 25 in engagement with corresponding depressions 27 formed in the rear face of the second fixer ring 14. When the operation sleeve 8 is rotated, this tongue-depression engagement operates to release the abutments 23 and 24 from the pressure contact. A lubricator ring 28 made of synthetic resin of a low friction coefficient, e.g. Teflon, is attached to the inner periphery 15 of the operation sleeve 8 in order to alleviate friction between the operation sleeve 8 and the first fixer ring 13.

The tool chuck with the above-described construction operates as follows.

For clamping operation, the holder ring 9 is kept unmovable and the operation sleeve 8 is manually rotated in the clamping direction. During this starting period the clamping jaws 4 are still out of contact with the tool A which, as a consequence, poses no reaction on the jaws 4. In the power transmission unit 11, the second fixer ring 14 is rotatable about the chuck body 2 and the tongues 26 on the elastic ring 25 are in engagement with the depressions 27 in the second fixer ring 14 under this condition. As a result, the input ring 12 and the fixer rings 13 and 14 rotate in one body with the operation sleeve 8 to drive the screw ring 6 for rotation at a rotation speed same as that of the operation sleeve 8. Following the principle screw feeding, the clamping jaws 4 advance forwards to hold the tool A.

Figure 4:
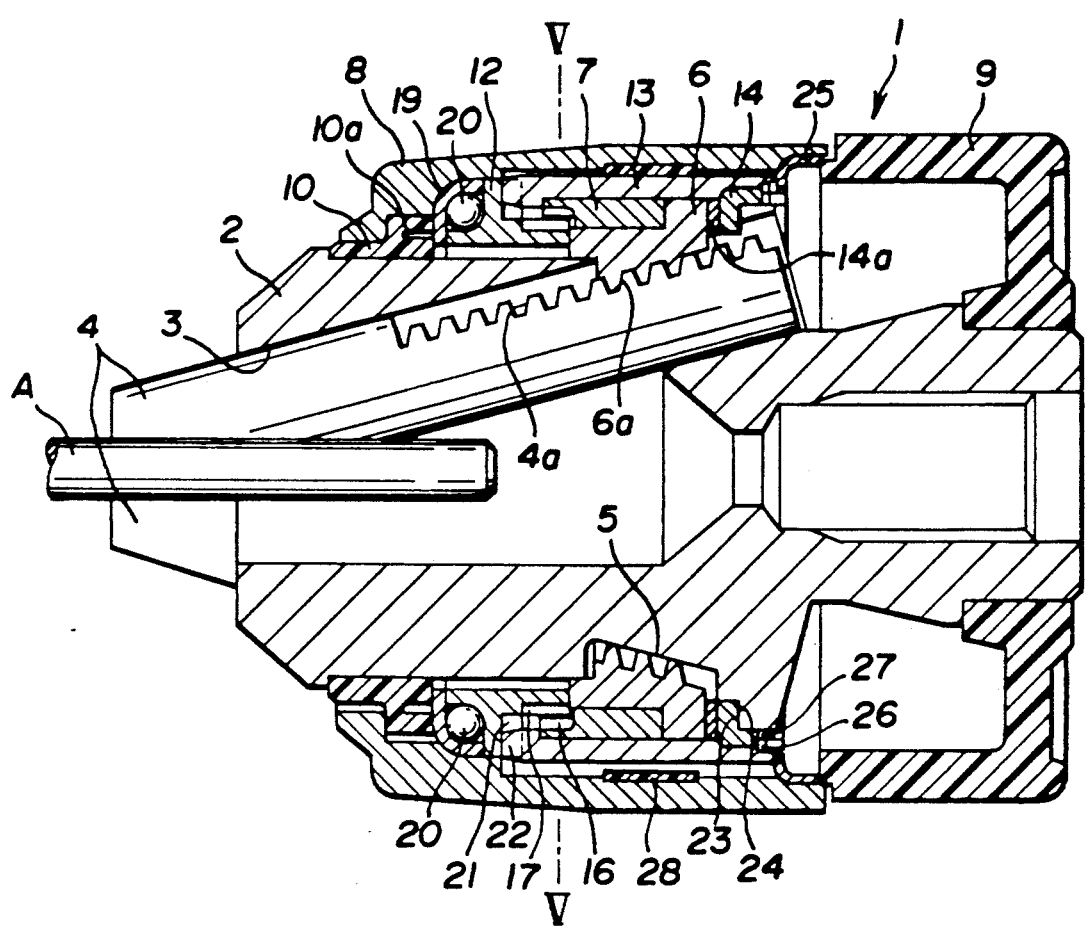
FIG. 4 is a side view, partly in section, of the tool chuck shown in FIGS. 1 and 2 is a position just after clamping the tool.
Figure 5:
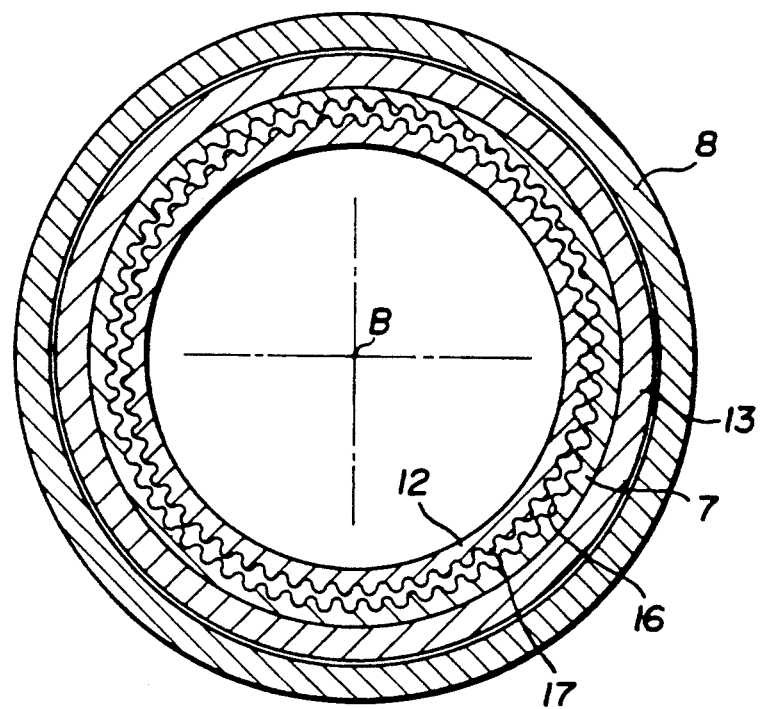
FIG. 5 is a section taken along a line V—V in FIG. 4.

Next as shown in FIG. 4, the clamping jaws 4 come into contact with the tool A which then imposes a reaction on the jaws 4 to urge the screw ring 6 to move rearwards. This rearward movement of the screw ring 6 put the abutments 23 and 24 into pressure contact via the lubricative washer 14a and fixes the second fixer ring 14 to the chuck body 2 in one body. The first fixer ring 13 is fixed also. As a result, rotation of the operation sleeve 8 causes revolution of the input ring 12 through contact with its inner periphery 15 so that the difference in teeth number between the cycloidal gear teeth 16 and 17 drives the input ring 12 for corresponding rotation. Due to high degree of deceleration, the output torque from the input torque is greatly amplified and strongly rotates the screw ring 6 for firm holding of the tool A by the clamping jaws 4.

During this process, relative rotation takes place between the rear face of the screw ring 6 and the front face of the second fixer ring 14 and presence of the solid lubrication coating 14b on the intervening washer 14a well reduces friction during the relative rotation, thereby mitigating loss of torque in power transmission.

In the above-described procedure, the reaction from the tool A acts to cancel meshing engagement between the cycloidal gear teeth 16 and 17. More specifically, when the torque from the operation sleeve 8 exceeds a certain value, pressure contact between tips 16a and 17a of the cycloidal gear teeth 16, 17 (see FIG. 6) moves the input ring 12 towards the center axis B of the chuck body 2 against the elastic behavior of the elastic sleeve 10 which is in turn compressed in the diametric direction to store energy. This causes momentary separation between the cycloidal gear teeth 16 and 17. As shown with a chain line in FIG. 6, the moment the tips 16a and 17a of the cycloidal gear teeth 16, 17 slip over one tooth, the elastic sleeve 10 releases the energy stored therein, and the input ring 12 resumes its initial position off the center axis B. Thereupon, meshing engagement between the cycloidal gear teeth 16 and 17 is impulsively revived. As shown with solid lines in FIG. 6, the tips 16a and 17a of the cycloidal gear teeth 16, 17 have impulsively shifted over one tooth.

The impulsive meshing engagement in the cycloidal gear arrangement forces the screw ring 6 to further slight rotate in the clamping direction. The clamping force caused by this impulsive meshing engagement is twice as more as large as the clamping force resulted from the difference in gear teeth only.

For unclamping of the tool A, the operation sleeve 8 is manually rotated opposite to the clamping direction. As long as the abutments 23 and 24 are in pressure contact, the power transmission unit 11 is kept under a high torque condition and rotation of the operation sleeve 8 induces unclamping rotation of the screw ring 6 at high torque to move the clamping jaws 4 rearwards. As the reaction from the tool A disappears, the elastic ring 25 forces the second fixer ring 14 to move forwards to release the abutments 23 and 24 from the pressure contact and deceleration by the power transmission unit 11 is cancelled. The screw ring 6 now rotates at a rotation speed same as that of the operation sleeve 8 to quickly move the clamping jaws 4 out of holding on the tool A.

As is clear from the foregoing description, presence of the lubricative washer 14a well reduces friction between the screw ring 6 and the second fixer ring 14 during their relative rotation and, as a consequence, rotation of the screw ring 6 is effectively utilized for holding by the clamping jaws 4. Stated otherwise, small manual torque on the operation sleeve 8 can produce large mechanical hold on the tool A. Since the solid lubrication coating 14b is applied to the washer 14a, the resultant construction is simpler and more compact than friction reduction by a ball bearing.

As a substitute for use of the lubricative washer 14a, the solid lubrication coating 14b may be applied to the rear face of the screw ring 6 itself.

Although the foregoing explanation is directed to a tool chuck without a chuck key, the present invention is applicable to a tool chuck provided with a chuck key as a substitute for the power transmission unit.

I claim:
1. A tool chuck comprising
a tubular chuck body provided with a plurality of coaxially arranged guide holes which are formed in a front section and collectively converge forwards and an annular cutout formed in an intermediate section,
a screw ring rotatably received in said annular cutout in said chuck body,
a plurality of clamping jaws slidably accommodated in said guide holes in said chuck body and each having a proximal section kept in outward screw engagement with said screw ring,
an operation sleeve inserted over said chuck body and operationally related to said screw ring so that manual rotation of said operation sleeve causes concurrent rotation of said screw ring, and
a solid lubrication coating layer arranged between a rear face of said screw ring and the corresponding wall of said annular cutout in said chuck body.
2. A tool chuck as claimed in claim 1 wherein said solid lubrication coating layer is applied to a washer attached to said rear face of said screw ring.
3. A tool chuck as claimed in claim 1 wherein said solid lubrication coating layer is applied directly to said rear face of said screw ring.
4. A tool chuck as claimed in claim 1 wherein said solid lubrication coating layer contains at least one of molybdenum bisulfide, graphite and fluorine resin.
5. A tool chuck as claimed in claim 2 in which said solid lubrication coating layer contains at least one of molybdenum bisulfide, graphite and fluorine resin.
6. A tool chuck as claimed in claim 3 in which said solid lubrication coating layer contains at least one of molybdenum bisulfide, graphite and fluorine resin.

* * * * *